United States Patent [19]
Cole

[11] Patent Number: 5,386,666
[45] Date of Patent: * Feb. 7, 1995

[54] AUTOMATED SYSTEM FOR CONTROLLING TAPER LENGTH DURING THE LAPPING OF AIR BEARING SURFACE OF MAGNETIC HEADS

[75] Inventor: Robert A. Cole, Newark, Calif.

[73] Assignee: Read-Rite Corporation, Milpitas, Calif.

[*] Notice: The portion of the term of this patent subsequent to Apr. 20, 2010 has been disclaimed.

[21] Appl. No.: 16,272

[22] Filed: Feb. 11, 1993

[51] Int. Cl.⁶ .............................................. B24B 49/00
[52] U.S. Cl. ........................................... 451/5; 451/8; 451/28
[58] Field of Search ........... 51/165 R, 165.71, 165.74, 51/165.75, 165.76, 165.77, 281 R, 283 R, 326, 125; 29/603

[56] References Cited

U.S. PATENT DOCUMENTS

| | | | |
|---|---|---|---|
| 4,511,942 | 4/1985 | Valstyn | 51/281 R |
| 4,841,625 | 4/1985 | Valstyn | 51/165 R |
| 4,861,398 | 8/1989 | Fukuoka et al. | 156/64 |
| 4,912,883 | 4/1990 | Chang et al. | 51/165 R |
| 5,065,483 | 11/1991 | Zammit | 51/165 R |
| 5,203,119 | 4/1993 | Cole | 51/165.77 |
| 5,214,589 | 5/1993 | Tang | 51/165 R |

Primary Examiner—Maurina T. Rachuba
Attorney, Agent, or Firm—Nathan N. Kallman

[57] ABSTRACT

An automated system for forming a taper on thin film magnetic heads comprises a lapping fixture positioned in apposition to a rotary lapping plate. A ceramic bar, upon which the magnetic heads are deposited and from which air bearing head sliders are fabricated, is attached to an adjustable transfer tool that is secured to a yoke holder. The holder is fixed securely on the lapping fixture so that the air bearing surface of the magnetic heads face the surface of the lapping plate. During the tapering process, data signals are obtained representative of the length of the taper being formed upon the heads spaced along the bar. The signals are calibrated and processed by a computer which provides command signals for varying the weight or pressure upon the lapping fixture across the fixture during tapering, allowing uniformity of taper to be achieved along with automatic termination of the tapering process upon obtaining the desired taper across the ceramic bar.

10 Claims, 3 Drawing Sheets

AUTOMATED SYSTEM FOR CONTROLLING TAPER LENGTH DURING THE LAPPING OF AIR BEARING SURFACE OF MAGNETIC HEADS

CROSS-REFERENCE TO PATENTS

U.S. Pat. No. 5,117,589 entitled "Adjustable Transfer Tool for Lapping Magnetic Head Sliders", issued to P. Bischoff et al., and assigned to the same assignee, discloses an adjustable transfer tool having a configured slotted section and a lever element to allow varying the air bearing surface of magnetic head sliders.

U.S. Pat. No. 5,214,589 entitled "Throat Height Control During Lapping of Magnetic Heads", issued to George Tang and assigned to the same assignee, discloses an M-H looper circuit that measures head saturation current to enable the control of throat height during lapping of thin film heads.

U.S. Pat. No. 5,203,119 entitled "Automated System for Lapping Air Bearing Surface of Magnetic Heads", issued to Robert A. Cole, and assigned to the same assignee, discloses a method of varying lapping pressure across a row of head sliders during lapping to achieve uniform lapping pressure across the row of sliders being lapped, to improve yield and tolerance.

The subject matter of the above patents are incorporated herein by reference.

FIELD OF THE INVENTION

This invention relates to a method and apparatus for controlling the manufacture of magnetic heads and in particular to a lapping system used during batch fabrication of magnetic heads.

DESCRIPTION OF THE PRIOR ART

Magnetic heads are used extensively in data processing systems, such as disk drives. During head production, batch fabrication is employed whereby a multiplicity of transducers are deposited in a row on a ceramic bar for lapping, polishing and processing simultaneously. The ceramic bar serves as a support or substrate for the transducers and subsequently is divided into head slider elements. During the manufacture of magnetic heads or head sliders with thin film transducers, the pole tips at which the transducing gap is disposed are ground and lapped to achieve a desired throat height at which optimum data signal processing can be realized. The throat height of all the transducers made during a production run for use with a data storage product must be maintained within a defined limited tolerance. Additionally, the configured air bearing surface of the head sliders is tapered during manufacture to precise tolerances in order to establish the air bearing surface characteristics of such heads. The leading edge of the sliders are tapered by holding the row of heads at a predetermined angle relative to a lapping plate and applying a given force or weight that urges the row of heads against the lapping plate. A problem that exists during the lapping process is that of nonuniform taper across the row of heads, resulting in incorrect taper on some head sliders with a loss in production yield. This is often caused by improper location of the given force relative to the row of heads which results in one end of the row receiving more taper than the other end, or an incorrect amount of time of lapping which causes insufficient or excessive taper of the whole row of heads, or a combination of both. Prior art systems employ manual positioning methods to initially adjust the location of the weight. Manual measurement of taper length across the row during lapping is used to determine weight position and the time remaining necessary to achieve proper taper length.

In a typical configuration, as shown in FIG. 2, the lapping fixture 7 is positioned at an angle relative to a lapping plate 3 through use of a tooling ball 20. The angle of the fixture relative to the lapping plate determines the angle at which the row of heads 1 will be lapped. However, the length of the taper to be formed on the row of heads 1 is not generally measured during this process using the prior art approach. As practised in the prior art, the length of the taper is measured manually by stopping the lapping process at various times to check the length of taper, or by using a timed system, wherein the lapping fixture is in contact with lapping plate 3 for a given length of time. When the manual procedures are performed in accordance with prior art procedures, experience has shown that the length of taper will significantly vary across the length of the row of heads 1, so that some slider elements will have either too long or too short a taper thereby causing a loss in production yield. The prior art approach is time-consuming, subject to operator error, does not uniformly correct for taper length across the entire row being lapped and does not afford optimum production yield.

SUMMARY OF THE INVENTION

An object of this invention is to provide an automated system for controlling the taper length on a row of magnetic heads that are formed from a ceramic bar, which automatically adjusts the location of the lapping force and the duration of the lapping process, thereby realizing an increase in production yield.

Another object of this invention is to provide an automated system for controlling taper length on a row of magnetic heads during the lapping process, whereby the lapping process is automatically terminated when the proper taper length has been achieved across the entire row of heads being lapped.

According to the invention, a ceramic bar, upon which a row of magnetic transducers is deposited and from which head sliders are formed, is attached to a transfer tool. A yoke element, which engages the transfer tool, is mounted to a lapping fixture that is positioned closely adjacent to a rotary lapping plate to implement lapping of the row of heads. The yoke element or transfer tool or lapping fixture has mounted on each end thereof, corresponding to each end of the row bar, means for measuring the height simultaneously at the ends of the row bar above the lapping plate. The height measuring means continually monitors the position of the lapping fixture and the ends of the row bar relative to the lapping plate. The measuring means compares the signals representing the change in heights of each end of the row bar during lapping and produces an error signal if the change in heights are different. The magnitude and polarity of the error signal indicates which end of the bar is lapped further than the other end by the polarity of the signal and the difference in change in height by the magnitude of the error signal. The error signal is directed to a servo control device which serves to vary the fixture pressure across the row bar. In this way, automated control of taper length by a closed loop feedback process is achieved on a continuous basis during the lapping process.

BRIEF DESCRIPTION OF THE DRAWINGS

The invention will be described in greater detail with reference to the drawing in which.

Similar numerals refer to similar elements throughout the drawing.

DETAILED DESCRIPTION OF THE PREFERRED EMBODIMENT

By way of explanation, a transfer tool 2 is formed as a substantially rectangular block, which may be made of a ceramic material or stainless steel part about two inches long. The tool 2 is mounted to a lapping fixture 7 to enable lapping of a row of heads 1 made of a ceramic material. Thin film transducers (not shown) are deposited and uniformly spaced along the row of heads. During fabrication of the magnetic heads, the row of heads 1 which is bonded to the bottom surface of the transfer tool 2 is lapped, sectioned and configured to produce a row of head sliders.

Figure 1:
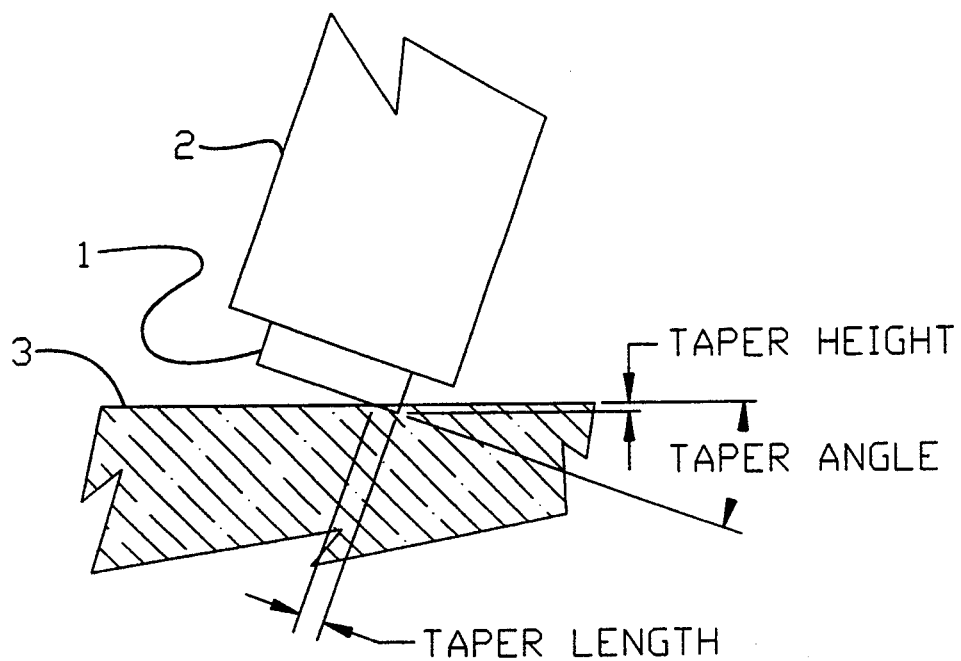
FIG. 1 is a side view of a row of heads mounted to a transfer tool showing the relationship of taper angle and length to taper height.
Figure 2:
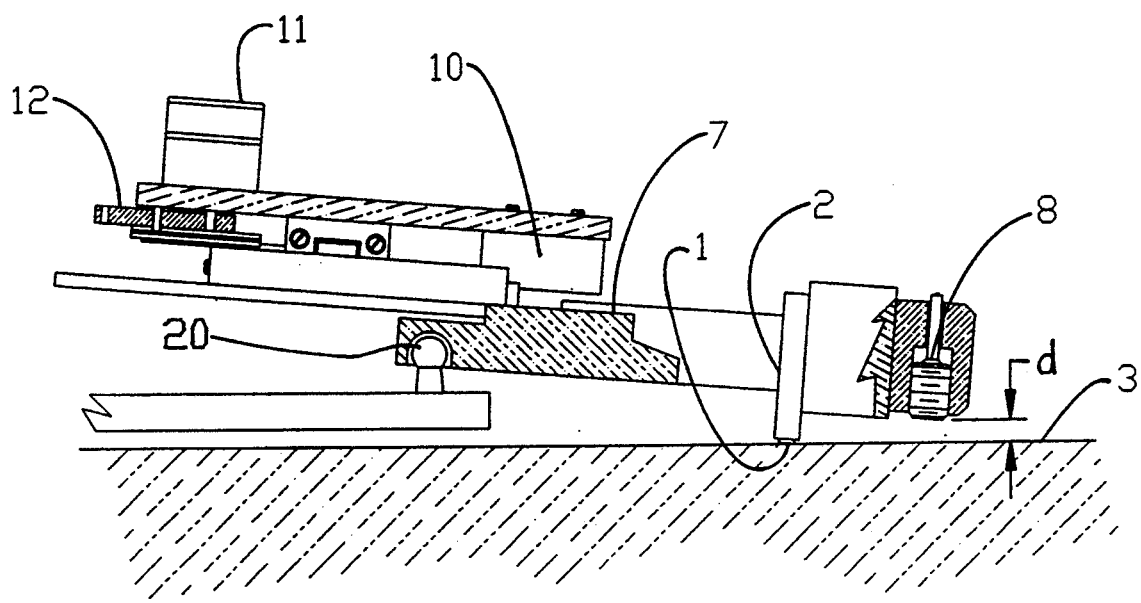
FIG. 2 is a cross-sectional side view of a lapping fixture with a transfer tool installed in the fixture, as implemented with this invention.
Figure 3:
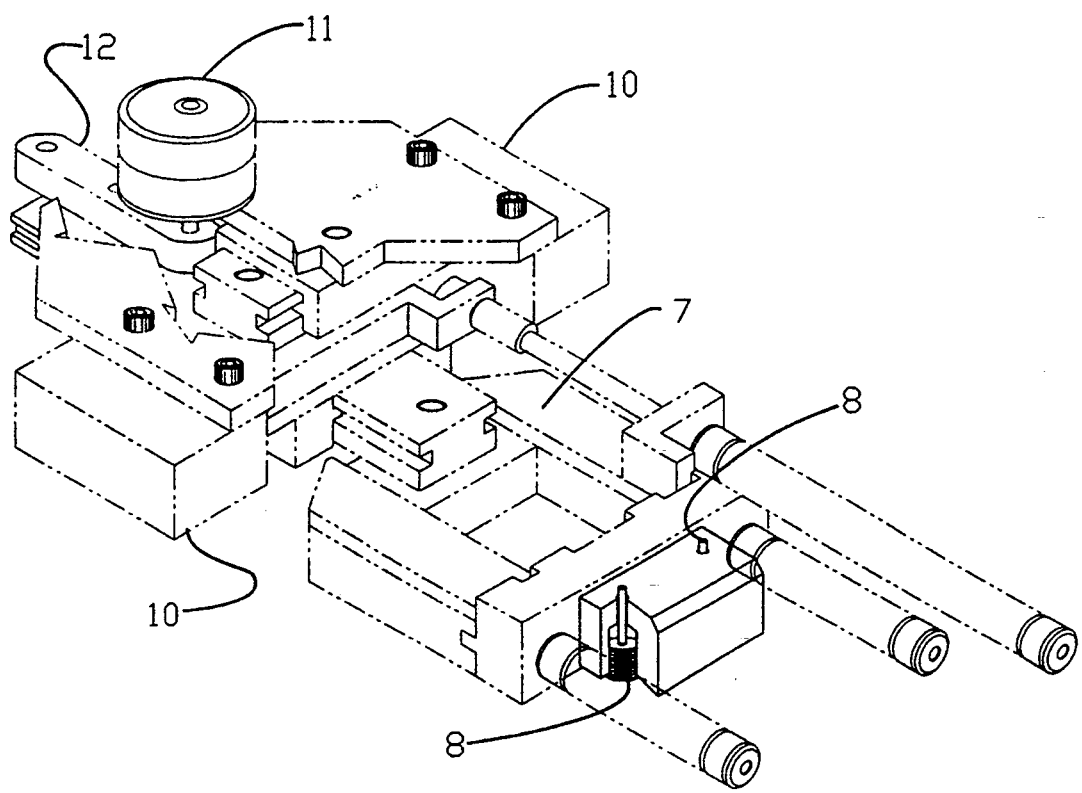
FIG. 3 is an isometric view of the assembly of FIG. 2.

In FIG. 2, the lapping fixture 7 is shown with the row of heads 1 in contact with the lapping plate 3. The row of head 1 is attached to the transfer tool 2. A noncontact sensor 8, illustrated in FIG. 2, measures the distance d between the fixture 7 and the lapping plate 3 on each side of the fixture at each respective end of the ceramic bar by noncontact means. The references $d_L$ and $d_R$ are defined as the distances from the lapping plate to the sensing portions of the sensors that are attached to the lapping fixture. The distances $d_R$ and $d_L$ represent such distances at the right and left sensors respectively. The noncontact sensing means may include an eddy current measuring device, reflective light sensors, capacitance sensors or other electromagnetic sensing means, such as Doppler sensors, by way of example. The electrical signals representing the distances $d_R$ and $d_L$ are directed to a computer 9 to generate an error signal, which is used to change the location of the weight 10 on the fixture 7 and to vary the pressure applied to the row of heads 1. The computer measures the change in distance d at each side of the transfer tool.

The process is geared to cease automatically when each side of the ceramic fixture has been so lapped that the average of the decrease in distance d at each side of the fixture is equal to the stored predetermined amount. In this manner, a significant increase in yield is obtained. Irregularities which are experienced with the prior art approach when the lapping process is stopped to perform a manual inspection of the degree of taper are eliminated. Since the part can never be exactly or accurately replaced in the lapping assembly relative to the lapping plate at the exact angle that it was when removed from the assembly for an intermediate lapping operating inspection, this irregularity in taper is eliminated by use of this fixture.

In actual operation, the row of heads 1 is attached to transfer tool 2 which in turn is attached to lapping fixture 7. Lapping fixture 7, having either contact sensors 13 or noncontact sensors 8 attached thereto, is positioned above the lapping plate 3, as illustrated in FIG. 2. Initial readings are taken such that the distance d is measured on each side of the lapping fixture. These readings are sent back through applifiers 16 and analog-to-digital converters (ADC) 17 to a computer 9, which is connected to a stepper motor 11 that serves to shift the weight 10 to one side or the other of lapping fixture 7, thus varying the pressure across the length of bar of heads 1. Once the initial readings have been made and the computer records the initial distances $d_R$ and $d_L$, the lapping process is commenced. Continually during the lapping process, the readings for $d_R$ and $d_L$ from each side is fed to the computer, which then determines the change and the difference in distance d from the initial value of d and compares the differences for each side. As a result, the computer sends a signal to the stepper motor 11 to determine where to locate the weight 10. The positioning of the weight 10 is empirically determined based upon the particular material being lapped, the polishing material being used in the lapping process, and the lapping speed involved. When the average value of $d_R$ and $d_L$ reach a predetermined value representing a desired degree of taper upon the face of the row of heads 1, the process is automatically terminated. The operator may then remove the bar from the fixture and proceed with the next operation.

Figure 4:
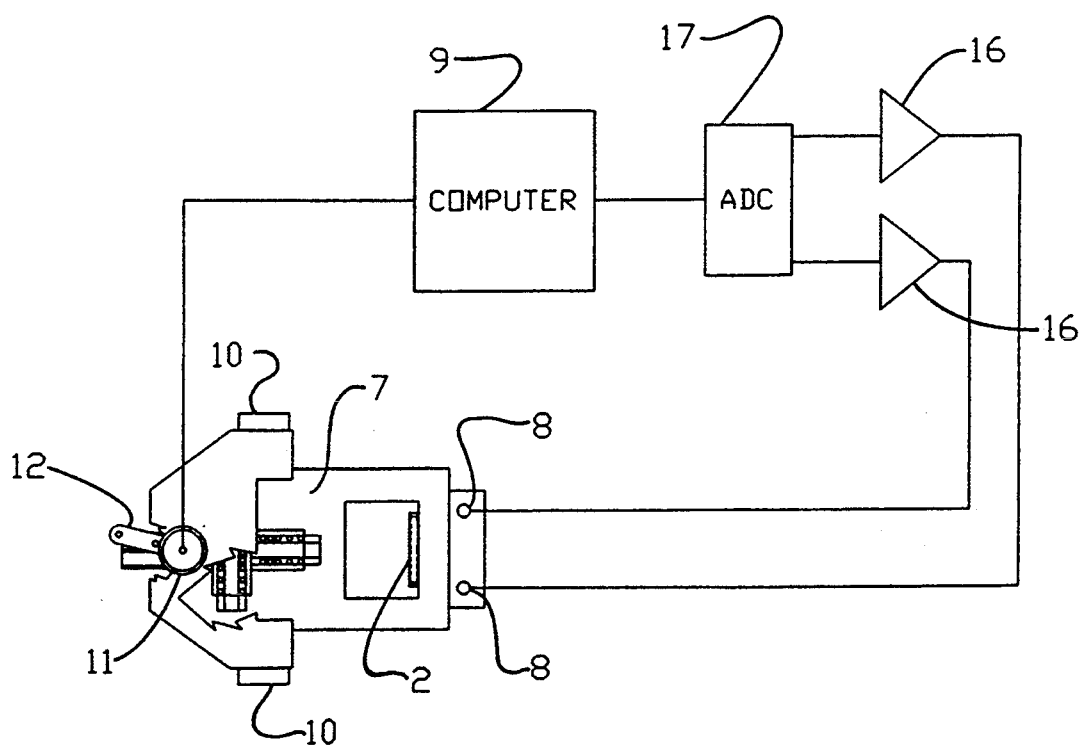
FIG. 4 is a schematic and block diagram of the automated system used with the lapping fixture, acording to this invention.

During the course of the lapping operation as a taper is formed, the initial distances $d_R$ and $d_L$, shown in FIG. 4, decreases. The initial distances are recorded at each side of the fixture, and as the taper is formed, the decrease in distance at each side can be monitored and nonuniformities corrected during the process by shifting the weight 10. The weight 10 is shifted by a stepper motor, with a crank mechanism 12 in response to a computer signal. When the average of the distances have decreased by a predetermined amount for the desired taper, which is stored in the computer, the taper operation will automatically stop. During the course of the tapering operation, an autolap control system using a computer 9 compares the two readings, and shifts the weight 10 slightly to one side or the other to correct for the differences.

Figure 5:
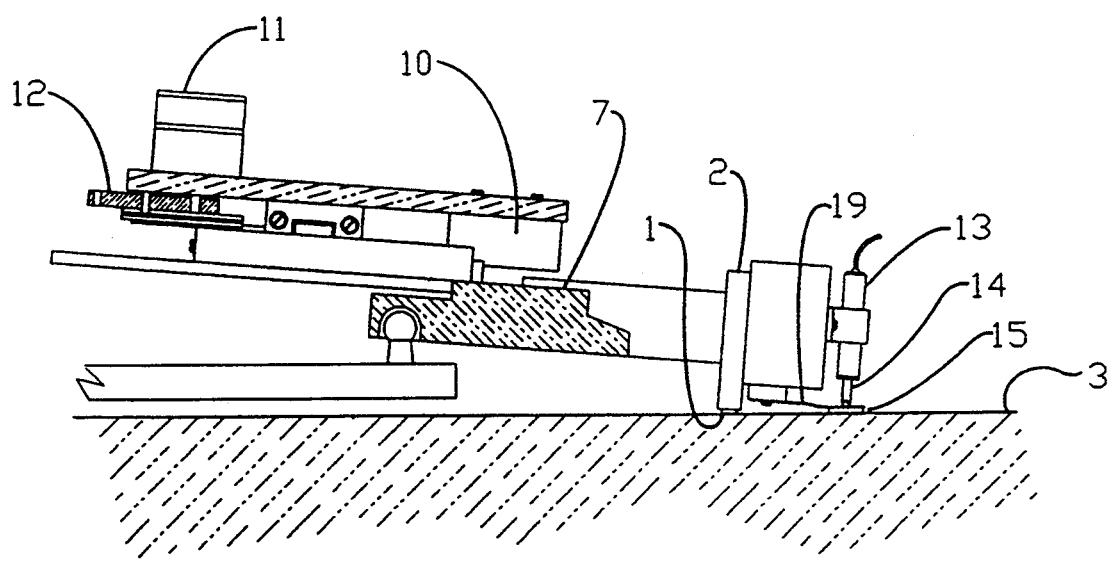
FIG. 5 is a side view of a lapping fixture illustrating the contact sensors used for achieving lapping.

The apparatus of FIG. 5 is similar to that of FIG. 2, but shows an embodiment using contact sensors 13L and 13R. FIG. 5 shows contact distance sensors 13L and 13R having contact probes 14 that are seated against a contact wear pad or reference plate 15, which is in contact with the lapping plate 3. The contact sensors 13 are attached to the front of the lapping fixture, for example. The probes 14 are always in contact with reference plate 15 during the course of the tapering operation.

As the contact sensor readings vary from one side or the other of the transfer tool 2, illustrating that the taper is not uniform across the row of heads 1, the computer 9 sends an error signal to a stepper motor 11. The error signal is used to effectuate a change in the location of the weight 10 on the lapping fixture 7 and thus a variation in pressure on the row of heads 1 to compensate for taper length across the length of the row of heads 1.

It should be understood that the invention disclosed herein is not limited to the specific parameters or values given by way of example and that modifications may be made within the scope of the invention. For example, the noncontact sensing device may be any one of a number of known noncontact sensors, and the contact sensing devices may be any one of different contact sensing devices. While in the illustrations the distance d is measured between the lapping plate and the sensor, the distance d may also be measured with reference to a reference surface located above the lapping fixture, or to the side of the lapping fixture. Thus for example, a pair of reflective plates can be placed to the side of the lapping fixture, and a horizontal light beam reflected from the sides of these plates may serve to measure the distance d, to control the lapping operation. Similarly, once the lapping fixture is placed in position upon the lapping plate, a reference plate may be placed above the lapping fixture, for contact or noncontacting sensing, to measure the distance d. In addition, other types of transfer tools or yokes may be utilized than that which is shown herein.

What is claimed is:

1. An automated system for lapping a taper upon thin film magnetic heads disposed in a row on a ceramic bar comprising:

a transfer tool to which said bar is mounted;

a lapping assembly including a rotary lapping plate;

a fixture for securing the transfer tool such that said bar is in apposition to said lapping plate;

a closed loop feedback system including means coupled to said fixture on each side of the ceramic bar for producing signals representing the height of the leading edge of the bar on each side of the bar; and means for comparing the signals produced during lapping to a reference for generating an error signal; and means for moving a weight or for varying the pressure across said fixture during lapping in response to said error signal to achieve uniform taper length across said bar.

2. A system as in claim 1, wherein said means for producing signals representing the height of the leading edge of the bar comprises nonphysical contact sensing means.

3. A system as in claim 1, wherein said means for producing signals representing the height of the leading edge of the bar comprises physical contact means.

4. The system as in claim 3, wherein said means for producing signals include an eddy current sensing device.

5. The system as in claim 3, wherein said means for producing signals include photoelectric sensing means.

6. The system as in claim 3, wherein said means for producing signals include light reflecting measuring means.

7. The system as in claim 3, wherein said means for producing signals is a capacitance sensor means.

8. A system as in claim 1, including a yoke coupled to said fixture, wherein said sensor means for producing signals is coupled to said yoke.

9. The system as in claim 1, wherein said means for producing signals is coupled to said transfer tool which is attached to said fixture.

10. A method of automatically processing thin film magnetic heads disposed in a row on a ceramic bar attached to a lapping fixture including a lapping plate for producing the proper taper length upon such bar which is attached to a transfer tool, comprising the steps of:

loading said transfer tool with said ceramic bar into a holder of said lapping fixture;

obtaining height level data representing the height of the leading edge of said bar at each end of said bar above said lapping plate;

continuously comparing and monitoring said height from each end of said bar during lapping; and continuously adjusting said fixture based upon the height data to achieve uniform taper across said bar during lapping.

* * * * *